United States Patent
Blackburn et al.

(10) Patent No.: US 12,432,249 B2
(45) Date of Patent: Sep. 30, 2025

(54) AUTOMATED CHANGING OF ADDRESS FOR TEMPORARY COMMUNICATION SYSTEMS

(71) Applicant: Wells Fargo Bank, N.A., San Francisco, CA (US)

(72) Inventors: Justin Blackburn, Gallatin Gateway, MT (US); Ryan Linn, Raleigh, NC (US); Jacob Donald Sheppard, Richfield, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 179 days.

(21) Appl. No.: 18/347,789

(22) Filed: Jul. 6, 2023

(65) Prior Publication Data

US 2025/0016188 A1    Jan. 9, 2025

(51) Int. Cl.
*G06F 21/57* (2013.01)
*G06F 21/50* (2013.01)
*H04L 9/40* (2022.01)
*H04L 61/3015* (2022.01)
*H04L 61/5007* (2022.01)
*H04L 67/10* (2022.01)

(52) U.S. Cl.
CPC ...... *H04L 63/1433* (2013.01); *H04L 61/3025* (2013.01); *H04L 61/5007* (2022.05); *H04L 67/10* (2013.01)

(58) Field of Classification Search
None
See application file for complete search history.

(56) References Cited

U.S. PATENT DOCUMENTS

| | | | |
|---|---|---|---|
| 8,069,471 | B2 | 11/2011 | Boren |
| 8,572,735 | B2 | 10/2013 | Ghosh et al. |
| 8,635,490 | B2 | 1/2014 | Narayanaswamy et al. |
| 9,426,834 | B2 | 8/2016 | Greene et al. |
| 9,454,592 | B2 | 9/2016 | Mills et al. |
| 9,501,541 | B2 | 11/2016 | Doering et al. |
| 9,906,500 | B2 | 2/2018 | O'Hare et al. |
| 10,225,269 | B2 | 3/2019 | Yi |
| 10,637,994 | B2 | 4/2020 | Amin et al. |
| 10,762,204 | B2 | 9/2020 | Yuen et al. |
| 10,904,288 | B2 | 1/2021 | Robertson |
| 2006/0031306 | A1* | 2/2006 | Haverkos ............... H04L 51/48 709/206 |

(Continued)

OTHER PUBLICATIONS

Noel Burton-Krahn, HotSwap Network Solutions, pp. 205-212 of the Proceedings of LISA '02: Sixteenth Systems Administration Conference, (Berkeley, CA: USENIX Association, 2002), 8 pages.

(Continued)

*Primary Examiner* — Christopher B Robinson
(74) *Attorney, Agent, or Firm* — Merchant & Gould P.C.

(57) ABSTRACT

An example computer system for providing a communication system can include: one or more processors; and non-transitory computer-readable storage media encoding instructions which, when executed by the one or more processors, causes the computer system to: monitor criteria associated with the communication system; assign a weight to the criteria to determine a risk score associated with the communication system; and automatically change an address of the communication system when the risk score exceeds a threshold.

20 Claims, 7 Drawing Sheets

(56) References Cited

U.S. PATENT DOCUMENTS

| | | |
|---|---|---|
| 2006/0149842 A1 | 7/2006 | Dawson et al. |
| 2007/0210909 A1 | 9/2007 | Addy |
| 2010/0306772 A1 | 12/2010 | Arnold et al. |
| 2012/0110672 A1* | 5/2012 | Judge ............... H04L 51/212 |
| | | 709/206 |
| 2012/0131226 A1 | 5/2012 | Stevens et al. |
| 2013/0189944 A1 | 7/2013 | McCoy |
| 2013/0295891 A1 | 11/2013 | Moon et al. |
| 2014/0125759 A1 | 5/2014 | Chalasani et al. |
| 2016/0219154 A1 | 7/2016 | Veron et al. |
| 2017/0279826 A1 | 9/2017 | Mohanty et al. |
| 2017/0353978 A1 | 12/2017 | Ulinskas |
| 2018/0054427 A1 | 2/2018 | Revell |
| 2019/0147089 A1 | 5/2019 | Megahed et al. |
| 2020/0358617 A1 | 11/2020 | Baierlein et al. |
| 2022/0210013 A1* | 6/2022 | Araujo ............... G06F 9/5072 |
| 2022/0239568 A1 | 7/2022 | Celozzi et al. |
| 2023/0070546 A1* | 3/2023 | Mosby ............... G06F 21/566 |

OTHER PUBLICATIONS

U.S. Appl. No. 17/930,207, filed Sep. 7, 2022.
U.S. Appl. No. 18/333,913, filed Jun. 13, 2023.
U.S. Appl. No. 18/523,566, filed Nov. 29, 2023.
U.S. Appl. No. 18/587,487, filed Feb. 26, 2024.

\* cited by examiner

AUTOMATED CHANGING OF ADDRESS FOR TEMPORARY COMMUNICATION SYSTEMS

RELATED APPLICATION(S)

This patent application is related to U.S. patent application Ser. No. 17/930,207 filed on Sep. 7, 2022 and U.S. patent application Ser. No. 18/333,913 filed on Jun. 13, 2023, the entireties of which are hereby incorporated by reference.

BACKGROUND

Cyber security events can disrupt internal communications within an entity, such as email, instant messaging, video conferencing, etc. Worse yet, an attack can be on the communication system itself. For instance, an attacker may have control of an email system, which would render it impossible for users to communicate securely to resolve an event. In addition, documentation systems may contain the exact architectural layouts of systems, telling intruders how to prevent engineers from stopping attackers. This can make remediation of such an attack challenging.

SUMMARY

Examples provided herein are directed to automated changing of addresses used for temporary self-provisioning communication systems.

According to aspects of the present disclosure, an example computer system for providing a communication system can include: one or more processors; and non-transitory computer-readable storage media encoding instructions which, when executed by the one or more processors, causes the computer system to: monitor criteria associated with the communication system; assign a weight to the criteria to determine a risk score associated with the communication system; and automatically change an address of the communication system when the risk score exceeds a threshold.

The details of one or more techniques are set forth in the accompanying drawings and the description below. Other features, objects, and advantages of these techniques will be apparent from the description, drawings, and claims.

DETAILED DESCRIPTION

This disclosure relates to temporary self-provisioning communication services. In the examples provided herein, the communications services allow personnel of an entity to communicate in a secure and reliable manner during a cyber security event.

For instance, during a cyber security event, one or more systems of an entity, such as a business, can be compromised. The impacted systems can include the communication systems of the business. In order to remediate the effects of the cyber security event, personnel of the business need a secure manner by which to communicate. To accomplish this, the communication systems described herein provide a temporary and secure way for the personnel to communicate.

In some examples, the temporary self-provisioning communication services can be secured (e.g., by Transport Layer Security (TLS)) and update-to-date on all patches. The communication services can be standalone (e.g., not relying on other infrastructure to function) and ideally untraceable to the entity. Further, the communication services can be deployed and removed as a single bundle. Other possible characteristics of the communication services include the ability to manage users (including changing of passwords) and be auditable.

In some implementations, the communication services can be implemented on a cloud-based architecture or on physical hardware. The communication services can be implemented on virtual machines. Further, aspects of the communication services are ideally non-attributable to the entity. For instance, any billing associated with the communication services, such as hosting costs, are handled in a manner that is not attributable to the entity. Further, the Domain Name System (DNS) aspects of the communication system, including registration and certificate, are ideally non-attributable to the entity.

In this manner, the example communication services described herein provide a secure and temporary manner by which personnel can communicate during a cyber security event.

Figure 1:
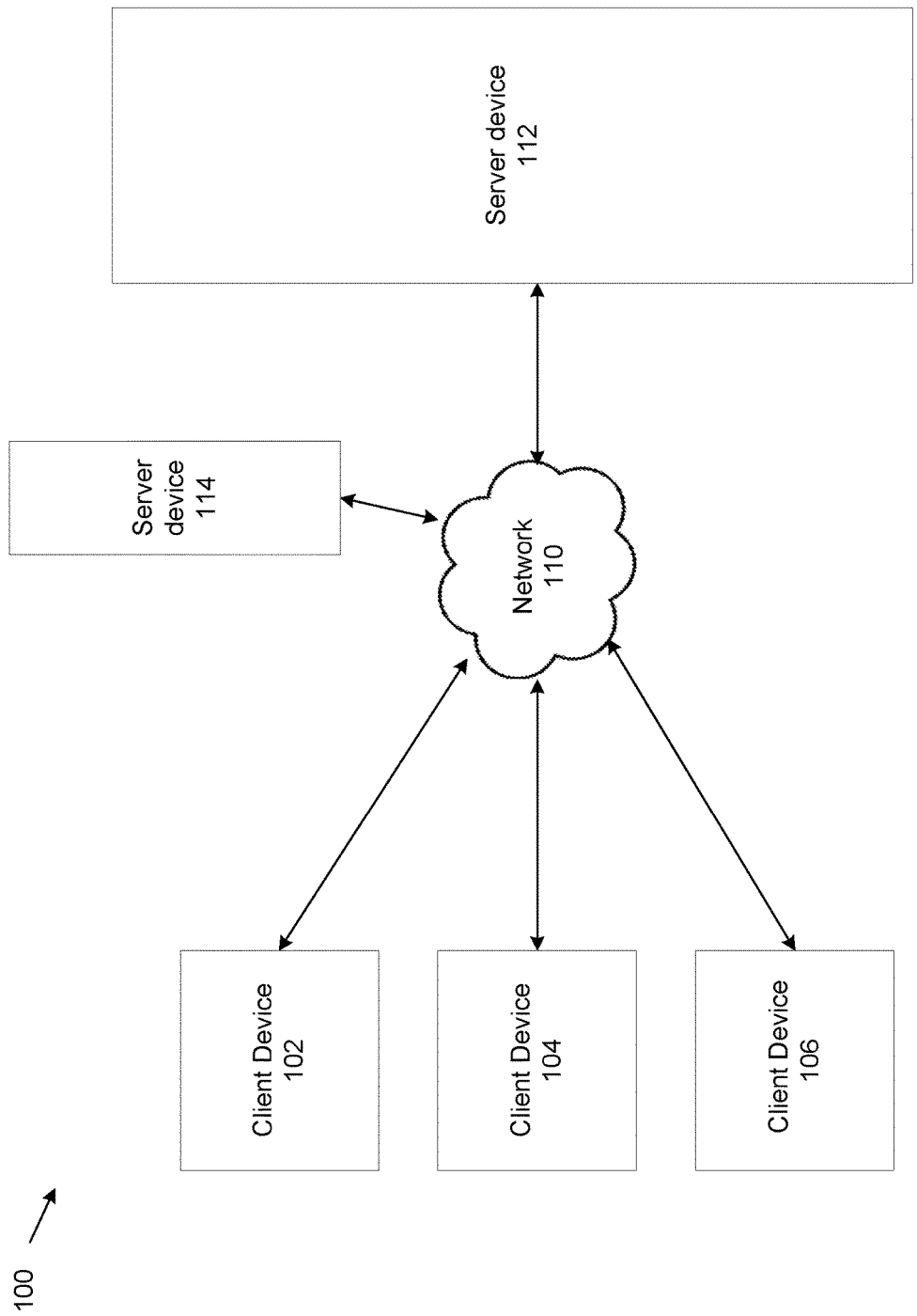
FIG. 1 shows an example system for providing temporary communication services.

FIG. 1 schematically shows aspects of one example system 100 for an entity. The entity can be any type of business. In one non-limiting example, the entity is a financial institution that provides financial services to customers. However, the concepts described herein are equally applicable to other types of entities.

Generally, the system 100 can be a typical computing environment that includes a plurality of client devices 102, 104, 106 and a server device 112. The client devices 102, 104, 106 communicate with the server device 112 to accomplish business tasks.

Each of the client devices 102, 104, 106 and the server device 112 may be implemented as one or more computing devices with at least one processor and memory. Example computing devices include a mobile computer, a desktop computer, a server computer, or other computing device or devices such as a server farm or cloud computing used to generate or receive data.

In the examples shown, the client devices 102, 104, 106 can be used by customers or employees of the business to conduct business. For instance, the client devices 102, 104, 106 can communicate with the server device 112 through a network 110. The server device 112 can be programmed to deliver functionality to the client devices 102, 104, 106. For example, in one embodiment, the server device 112 is one or more computers (typically a server farm or part of a cloud computing environment) that facilitates the various business processes of the entity, along with providing communication services like email, instant messaging, video conferencing, etc.

When a cyber security event occurs, one or more of the client devices 102, 104, 106 and/or the server device 112 can be compromised. An example of such a cyber security event includes a third party (e.g., a malicious actor) gaining access to functionality of the server device 112 through social engineering, an exploit, etc. Once compromised, the functionality provided by the server device 112, including the communication services, may not be trusted.

To remediate the cyber security event, it may be necessary for the entity to perform various actions on the server device 112, including possibly removing accounts, restoring data and programs, reformatting disks, etc. This could impact the communication services provided by the server device 112, further complicating the remediation tasks.

Figure 2:
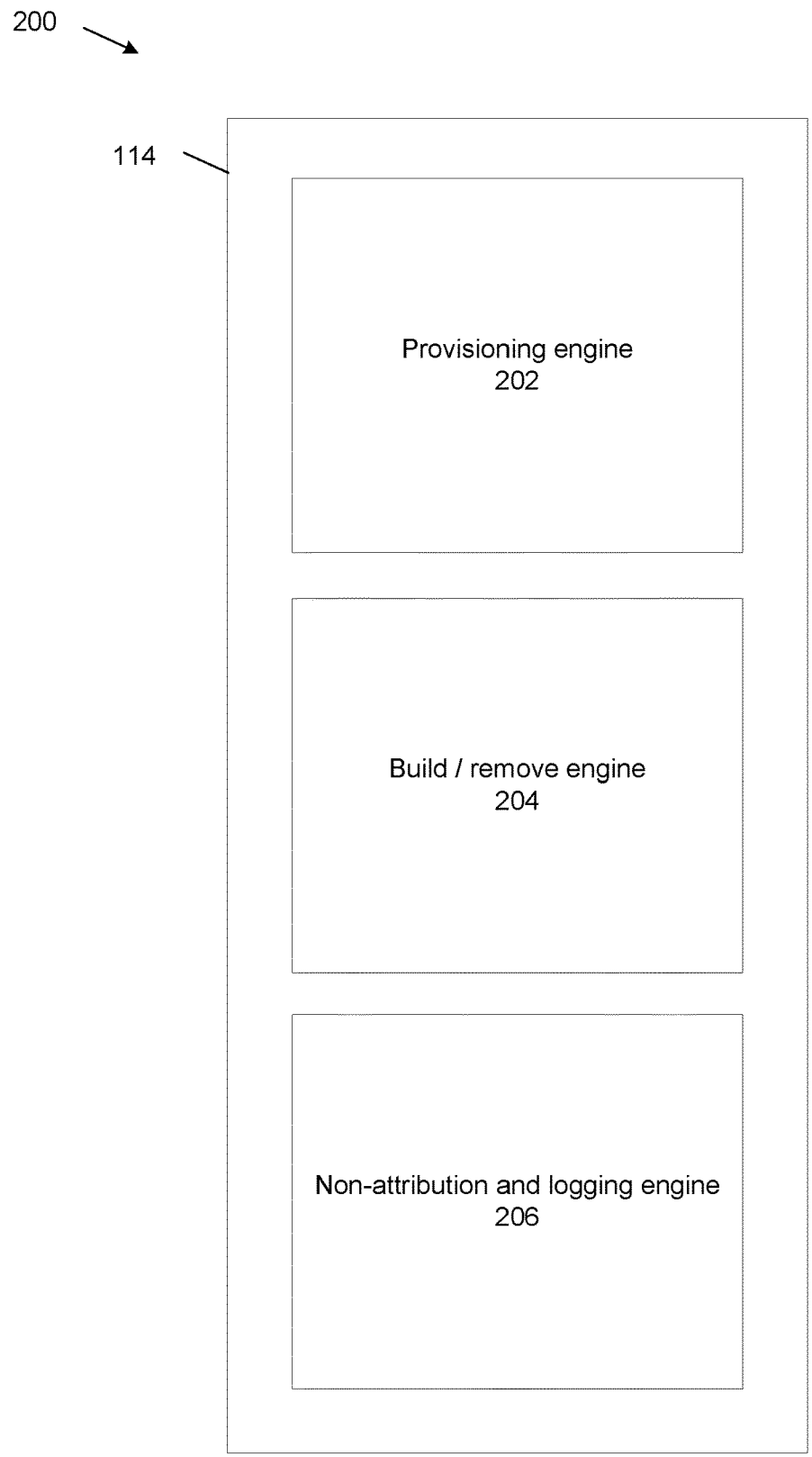
FIG. 2 shows example logical components of a communication system of the system of FIG. 1.
Figure 3:
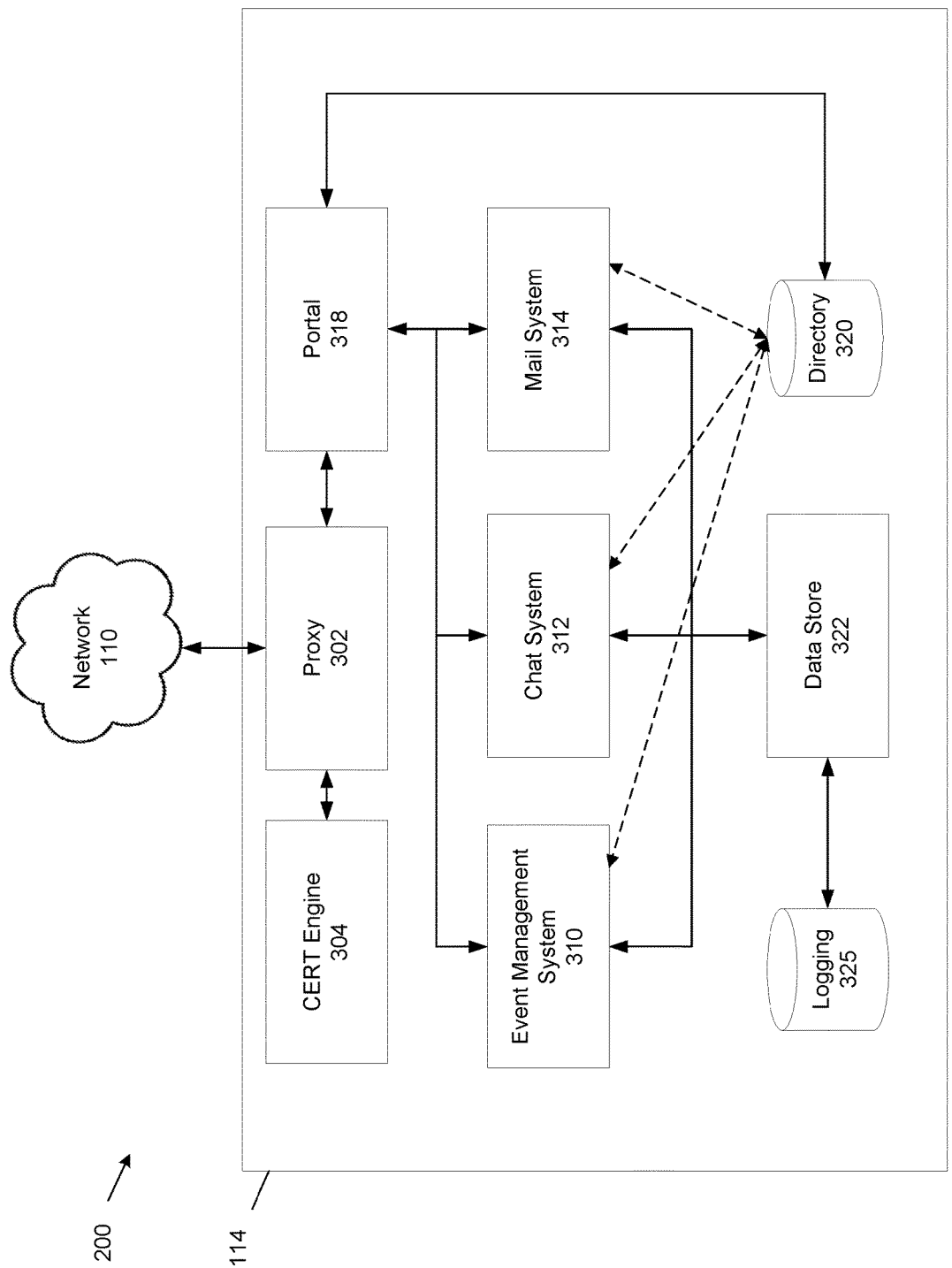
FIG. 3 shows an example logical view of the communication system of FIG. 2.

Referring now to FIGS. 1-3, due to the breach of trust and possible interruptions in the communication services for the server device 112, a separate server device 114 is provisioned that is generally programmed to provide a temporary self-provisioning communication system 200. In generally, the communication system 200 is programmed to provide communication services between the client devices 102, 104, 106 during a cyber security event.

In this example, the server device 114 is hosted by an entity that is ideally unassociated with the entity owning the system 100. For instance, the server device 114 can be a cloud computing resource hosted by a third party, such as Amazon Web Services, Google Cloud Platform, or Microsoft Azure.

The communication system 200 can be container-based such that it can be run on a variety of platforms, including physical servers, virtual machines, and cloud-computing environments. This allows the communication system 200 to use micro-services to implement functionality. For instance, each application of the communication system 200 can be a sub-contained microservice that communicates with the other services of the communication system 200. This allows the microservices to work within any cloud environment and be transportable, such as by moving one or more of the microservices to a different hosting location. Examples of such container-based solutions include, without limitation: Kubernetes, Docker, Podman, rtk, Containerd, etc.

In this example, the communication system 200 is executed on a virtual machine running on the server device 114. The communication system 200 can include a provisioning engine 202, a build/remove engine 204, and a non-attribution and logging engine 206.

The example provisioning engine 202 is programmed to handle all the provisioning of the communication system 200. In one example, the provisioning engine 202 uses an infrastructure as code tool such as Terraform from HashiCorp to build and provision the communication system 200 on the server device 114.

This provisioning by the provisioning engine 202 can include everything from the DNS to container infrastructure to gathering the containers, etc. The provisioning can also include user load, the container interconnection, the proxy server with NGINX, the certificates, the microservices interconnection, and the combination of containers/OpenSSL backend with OpenSSL user maintenance that allows singular provisioning of the entire solution from creation ("ripcord standup") to removal ("ripcord teardown").

For instance, to provision users for the communication system 200, the provisioning engine 202 can be programmed to access a user directory, such as the user directory of the system 100 for the entity. The provisioning engine 202 sends out a communication, such as an email or text, to a subset of the users in that directory, as defined by one or more attributes stored in the directory.

For instance, a subset of the users in the directory can be defined as "key" entries that should be provisioned in the communication system 200 upon the occurrence of a cyber security event. Examples of such users include leadership, managers, and IT personnel. These key users can include contact information that can be used to provision the users on the communication system 200 when needed.

For instance, the communication to these key users is ideally sent to a non-attributable email address for each of the users. Within the communication, an address such as a Uniform Resource Locator (URL) is provided to locate the communication system 200. In this example, the location is domain non-attributable to the entity. The communication also can include initial credentials for the user on the communication system 200, such as the user's username and initial password. Once the user accesses the URL and provides the username and initial password, the user can setup a new password and access the resources provided by the communication system 200, including such functions as email, chat, and event management. Many other configurations are possible.

The example build/remove engine 204 is programmed to build and remove the communication system 200. In one embodiment, the communication system 200 can be built and removed with minimal manual effort. For instance, the communication system 200 can provide a "single click" to initiate the building and provisioning of the communication system 200. Once the single click request is made, the provisioning engine 202 can be programmed to execute and provision the communication system 200.

Further, a single click can be used to remove the communication system 200 once the communication system 200 is no longer needed, such as after the cyber security event has been mitigated. Once the single click is received by the build/remove engine 204, the entirety of the communication system 200 is deleted from the server device 114. This includes all accounts and data associated with the communication system 200 being scrubbed from the server device 114. Further, the DNS entries associated with the communication system 200 are removed, and any billing associated with the communication system 200 is ceased.

In some examples, the single click can be the selection of an installation file that is executed. Upon receipt of execution, the communication system 200 is automatically installed and provisioned. In another example, the single click can be a control on a graphical user interface, such as a button on a portal webpage. Once selection of the control is received, the communication system 200 is automatically installed and provisioned. Other configurations are possible.

The example non-attribution and logging engine 206 is programmed to facilitate the communication system 200 while minimizing the public connection between the communication system 200 and the entity. Billing associated with the communication system 200, such as hosting and registration costs, can be associated with a third party entity that is unrelated to the entity owning the system 100.

For instance, the billing for the hosting services for the server device 114 can be done through a third party so that the public does not know that the entity leasing the server device 114 is the entity. Purchases can be done in cash or through other non-traceable payment mechanisms, if needed. All interaction between the cloud-based provider and the entity can be done out-of-band to preserve the anonymity of the resources running on the server device 114. Many other configurations are possible.

The non-attribution and logging engine 206 can also be programmed to log the activities on the communication system 200. For instance, the non-attribution and logging engine 206 can be programmed to do offsite logging through log streaming using the Apache Kafka (or other) distributed events streaming platform. Further, in this example, log analytics for the communication system 200 can be done using the Elastic Stack log data resources. These analytics can include full backups and migration to other servers. Many other tools can also be used. Additionally, the logging engine could be configured to archive logs as necessary to comply with regulatory or other requirements applicable to the entity.

Referring now to FIG. 3, additional details on the communication system 200 are shown. Generally, the communication system 200 can include one or more of the following.

The communication system 200 can include a proxy 302, such as a NGINX web server. The communication system 200 can also include a certificate engine 304 that auto-provisions SSL certificates.

The communication system 200 can further including a backend set of microservices, including one or more of the following: an event management system 310, a chat system 312; and a mail system 314.

The example information and event management system 310 is a stand-alone microservice that manages and streamlines the process of issue resolution for the system 100. More specifically, the event management system 310 provides tracking of items associated with the mitigation of the cyber security event (as well as any other desired issues). In this example, the event management system 310 logs various aspects of each issue, including such information as the context of each issue, along with other data like category of issue, priority of issue, status of issue, etc. The event management system 310 can therefore provide documentation of a particular problem, its current status, and other associated information.

The example chat system 312 is a stand-alone microservice that provides messaging services for the users of the communication system 200. In one example, the chat system 312 includes instant messaging services that allow users to send and receive messages. Other features, like delivery confirmations and read receipts can be provided. Further, in some examples, features like messaging lists and self-destructing or ephemeral messages can be sent. In yet other embodiments, the chat system 312 can provide audio/visual messaging services, too. For instance, the chat system 312 can be programmed to provide audio and/or video conferencing for users. Many configurations are possible.

The example mail system 314 is a stand-alone microservice that provides electronic mail services. In this example, the mail system 314 can provide all the typical services of a mail system, such as sending and receiving of emails, calendaring, contacts, tasking, etc. The mail system 314 can be programmed to synchronize with standard mail clients, if desired. In yet other embodiments, the mail system 314 can include alternative features, such as self-destructing or ephemeral messages. Many configurations are again possible.

In this example, an example portal 318 is provided to allow the users to easily access the event management system 310, the chat system 312, and the mail system 314. For instance, because each of the event management system 310, the chat system 312, and the mail system 314 is implemented as a separate microservice, the microservices can be executed in disparate locations or even moved over time. The portal 318 provides a single place where a user can access information for each of the microservices.

For instance, the users can access the portal 318 using a URL provided to the users upon provisioning. Upon authentication, the portal 318 provides links to each of the microservices, including the event management system 310, the chat system 312, and the mail system 314. If the location for one or more of the microservices is changed, the portal 318 can be updated to reflect the new location. For instance, current URLs for each of the microservices can be provided on the portal 318.

The communication system 200 can include a directory 320, such as OpenLDAP, which is an open source implementation of the Lightweight Directory Access Protocol (LDAP). This can include a password change system, a persistent data store (e.g., data store 322), and a centralized logging system (e.g., logging store 325). Users can be provisioned via the LDAP. All system passwords can be stored in encrypted config files separate from the code base for the communication system 200.

The data associated with the communication system 200 can be stored in the data store 322. In some examples, the data store 322 can be a database associated with the server device 114. The example data store can store such data as the communications flowing through the communication system 200, event associated with the communication system 200, etc. Additionally, data store 322 could be configured to implement encryption-at-rest, data classification requirements, or other requirements necessary based on the data contained and/or regulatory or other requirements applicable to the entity.

Further, the logging aspects for the communication system 200 can be captured by the logging store 325. In some examples, the logging store 325 can be stored on the server device 114 or perform logging remotely, as described above. Many configurations are possible.

As previously noted, the communication system 200 is non-attributable to the entity. This can be accomplished through a single billing account through third party obscured backend billing.

The communication system 200 can include infrastructure as code stored in a code repository, such as one provided by GitHub, Inc., for both Terraform and all subcomponents. The code will run on a Virtual Machine running a container program that is auto-provisioned using Terraform.

There can be a static Internet Protocol (IP) address that is auto-provisioned via Terraform via the cloud hosting provider (e.g., the server device 114). There can be four DNS addresses assigned (mail, chat, event management, password change) that point to the static IP (A Records), plus an MX record for the mail server to send and receive mail (this can be done via Terraform via the cloud hosting provider).

In this configuration, the communication system 200 can be deployed and removed efficiently. As previously noted, it is possible to "pull the ripcord" through minimal manual involvement (e.g., one click) to setup the communication system 200 in an emergency, such as the cyber security event. Likewise, it is possible to "pull the ripcord" to remove or otherwise destroy the communication system 200 when no longer needed. This results in the communication system 200 being an ephemeral self-provisioning discrete communication system with mail, event management, and asynchronous communication.

Figure 4:
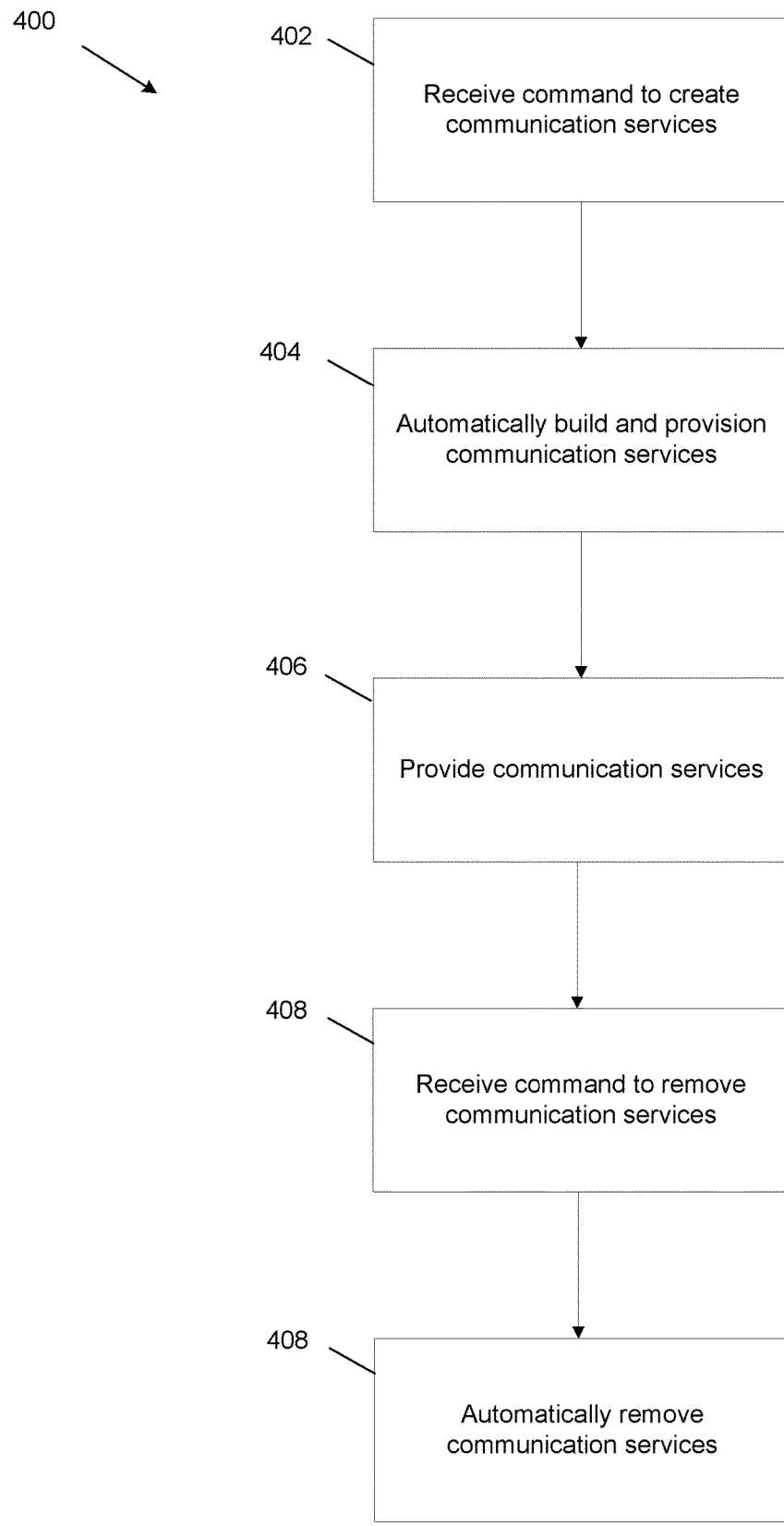
FIG. 4 shows an example method implemented by the system of FIG. 1.

Referring now to FIG. 4, an example method 400 for providing communication services is shown.

At operation 402, a command is received to create the communication services. As noted, this command can be as simply as the pushing of a button upon the identification of a cyber security event. Or, as detailed further below, the command can be automatically generated upon a certain event.

Next, at operation 404, the communication services are automatically built and provisioned. As noted, this can occur on a server that is not attributed to the entity.

Next, at operation 406, communication services are provided. This can include, without limitation, mail, chat, video conferencing, and/or event management.

Next, at operation 408, a command is received for removing the communication services. Similarly, the command can be as simply as clicking a button. This can occur, for instance, when normal communications have been restored for the entity.

Finally, at operation 408, the communication services are removed. This can be accomplished many ways, such as by deleting all the components of the communication services and ending the billing associated with the server space.

In another example, the command to create the communication services (for instance, at operation 402) can be initiated automatically. In such a scenario, assume an event that is sensed by the system 100 as being significant enough to automatically initiate the creation of the communication system 200. For instance, a catastrophic event, such as a ransomware attack, could automatically be sensed by the system 100, and the system 100 can be programmed to automatically initiate (e.g., according to a specific protocol) a non-attributable signal to create the communication system 200.

In such an example, the system can be programmed to scan the components of the system 100 and automatically generate containers and other cloud-based resources configured to identify possible adversaries and/or incidents. These containers can automatically create events and use technology, such as webhooks, to communicate the events.

All this can be driven through Artificial Intelligence (AI), with the AI growing more complex as more events are encountered. In such a scenario, the system can generate its own events and automatically notify the relevant parties of the events and possible remediation steps to address them.

Figure 5:
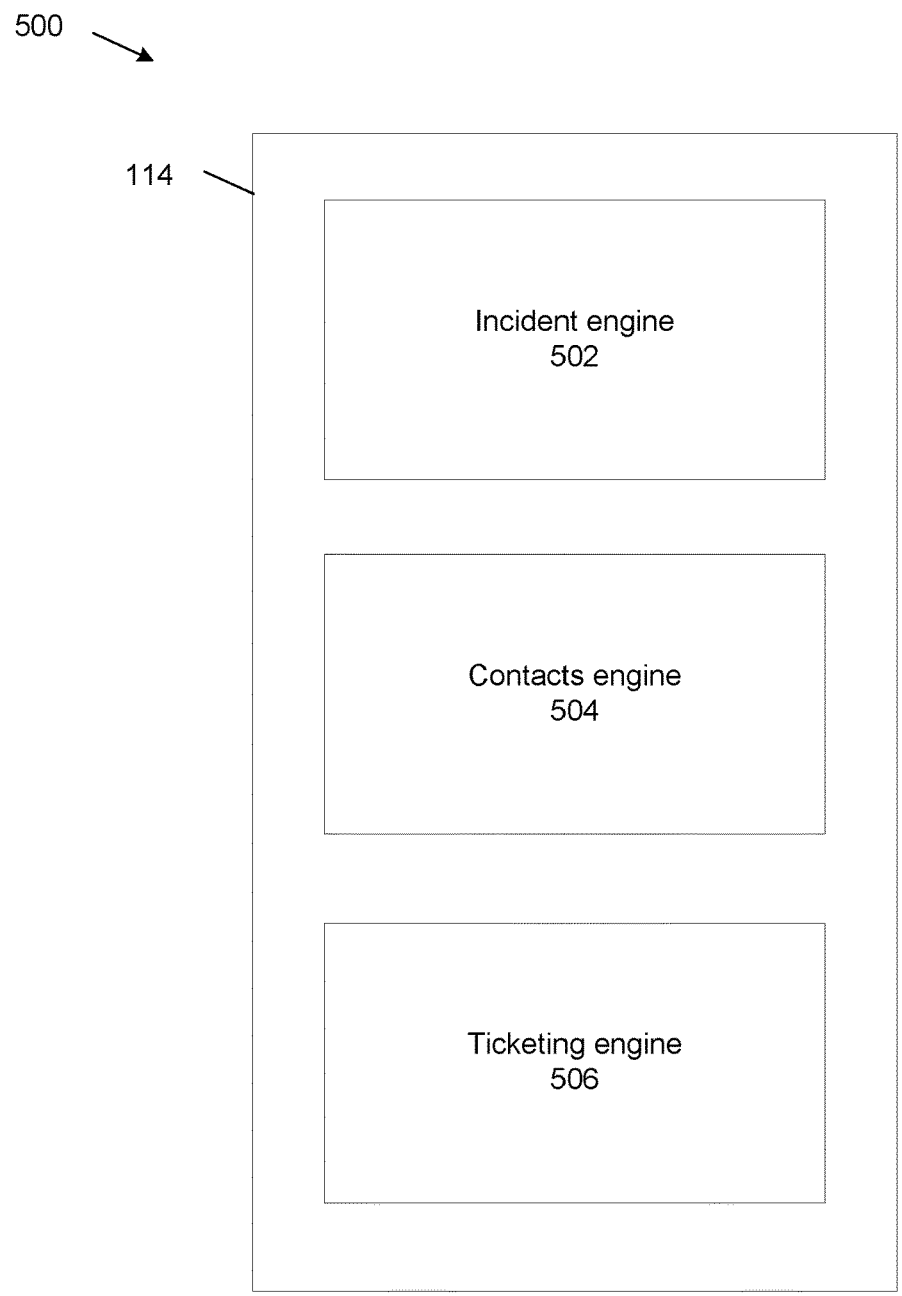
FIG. 5 shows example logical components of another communication system of the system of FIG. 1.

Referring now to FIG. 5, another embodiment of an example temporary self-provisioning communication system 500 created by the server device 114 is provided. The temporary self-provisioning communication system 500 is configured in a manner similar to the communication system 200 described above. However, in this instance, the server device 114 is also programmed to automatically provision various additional aspects of the temporary self-provisioning communication system 500 upon creation.

For instance, once the server device 114 is triggered to create the temporary self-provisioning communication system 500, a prewritten set of tickets, stored in a format such as Extensible Markup Language (XML) or JavaScript Object Notation (JSON), can be used to provision one or more of the event management system 310, the chat system 312, and the mail system 314.

This provisioning can include information about the specific event, contacts for users who are to be notified, and possible information about mitigation efforts. For example, the server device 114 can include trigger mechanisms for the various types of incidents as well as the groups/users who would be responsible for responding to each of the tickets associated with the mitigation efforts. The information for these individuals could be automatically loaded into the communication system 500 upon the trigger by the server device 114, as described below.

Specifically, the example server device 114 can include (in addition to the functionality described above for the server device 114 to instantiate the temporary self-provisioning communication system 200), an incident engine 502, a contacts engine 504, and a ticketing engine 506. These potential additional components of the server device 114 can be used to automatically provision the communication system 500 upon trigger and then automatically decommission the communication system 500 when the event is resolved.

In the example shown, the incident engine 502 is programmed to receive information about the cyber security event when the communication system 500 is created. For instance, the incident engine 502 can receive information from the server device 112 about the triggering cyber security event. In one example, the incident engine 502 can receive information about the event through APIs from various components of the system 100. In other examples, the incident engine 502 can also receive information about the cyber security event from third party systems.

Based on the triggering cyber security event, the incident engine 502 is programmed to identify and execute scripting to automate the provisioning of the communication system 500 to help remediate the event. In one example, a hierarchical JSON list is used to develop a series of tickets that are prepopulated with information based upon the type of event. The incident engine 502 analyzes the specific cyber security event that triggered the creation of the communication system 500 and selects one or more event types from the JSON list. These event types are then used to automate the provisioning of aspects of the communication system 500, such as prepopulating contacts, generating tickets for resolution of the event, etc.

For instance, assume that the incident engine 502 is prepopulated with a hierarchical list of possible events, including an event type A and an event type B.
1. Event Type A
   a. Triggering event: DDoS attack
   b. Contact list: contact list A
   c. Ticket list: ticket list A
2. Event Type B
   a. Triggering event: Unix attack
   b. Contact list: contact list B
   c. Ticket list: ticket list B The incident engine 502 is programmed to transverse the list and select the event type that matches the specific cyber security event. For instance, if the system 100 experiences a DDoS attack, the incident engine 502 is programmed to receive information about the attack and automatically select the "Event Type A" from the list by matching the triggering event to the event type.

If there is no matching event type in the list, the incident engine 502 can be programmed to select the closest matching event. Or, in some examples, the list can include one or more generic event types that can be used to provision the communication system 500 when a triggering cyber security event is not specifically addressed in the list. Many other configurations are possible.

The example contacts engine 504 is programmed to use the contact list A of the Event Type A to prepopulate groups and/or users in the chat system 312 and/or the mail system 314. In one example, the contacts engine 504 can receive a list of user names and use the LDAP to access contact information from the server device 112 for those users. There can be a hierarchy of user based upon the event types.

For instance, there can be a series of loops that are used to select users based upon the contact list A. In the instance of a DDoS attack, the groups and specific contacts who are responsible for DDoS data security can be included in the list and automatically provisioned in the communication system 500. Once provisioned, the users can be notified as described above to create the necessary accounts on the communication system 500.

The example ticketing engine 506 is programmed to use the ticket list A to automatically provision the event management system 310 with one or more tickets that are specific to the remediation of the cyber security event. This can include both automatic generation of the tickets and/or assignment of the tickets to one or more users as populated by the contacts engine 504. Through changes in status, the tickets can be automatically assigned priorities and updated appropriately.

For instance, for the event type A associated with a DDoS attack, tickets can be generated to identify which system(s) were breached and to reset credentials for the users of those systems. In such an example, the ticketing engine 506 is programmed to automatically generate those tickets within the event management system 310. Further, those tickets can be assigned to individuals designated by the contacts engine 504 to handle those types of tickets. As described above, the event management system 310 can thereupon be used to track the status of the tickets throughout the mitigation of the cyber security event.

Once the cyber security event has been mitigated, the entirety of the communication system 500 can be deleted from the server device 114, as described above. This includes all accounts and data associated with the communication system 500 being scrubbed from the server device 114. Further, the DNS entries associated with the communication system 500 are removed, and any billing associated with the communication system 500 is ceased.

Figure 6:
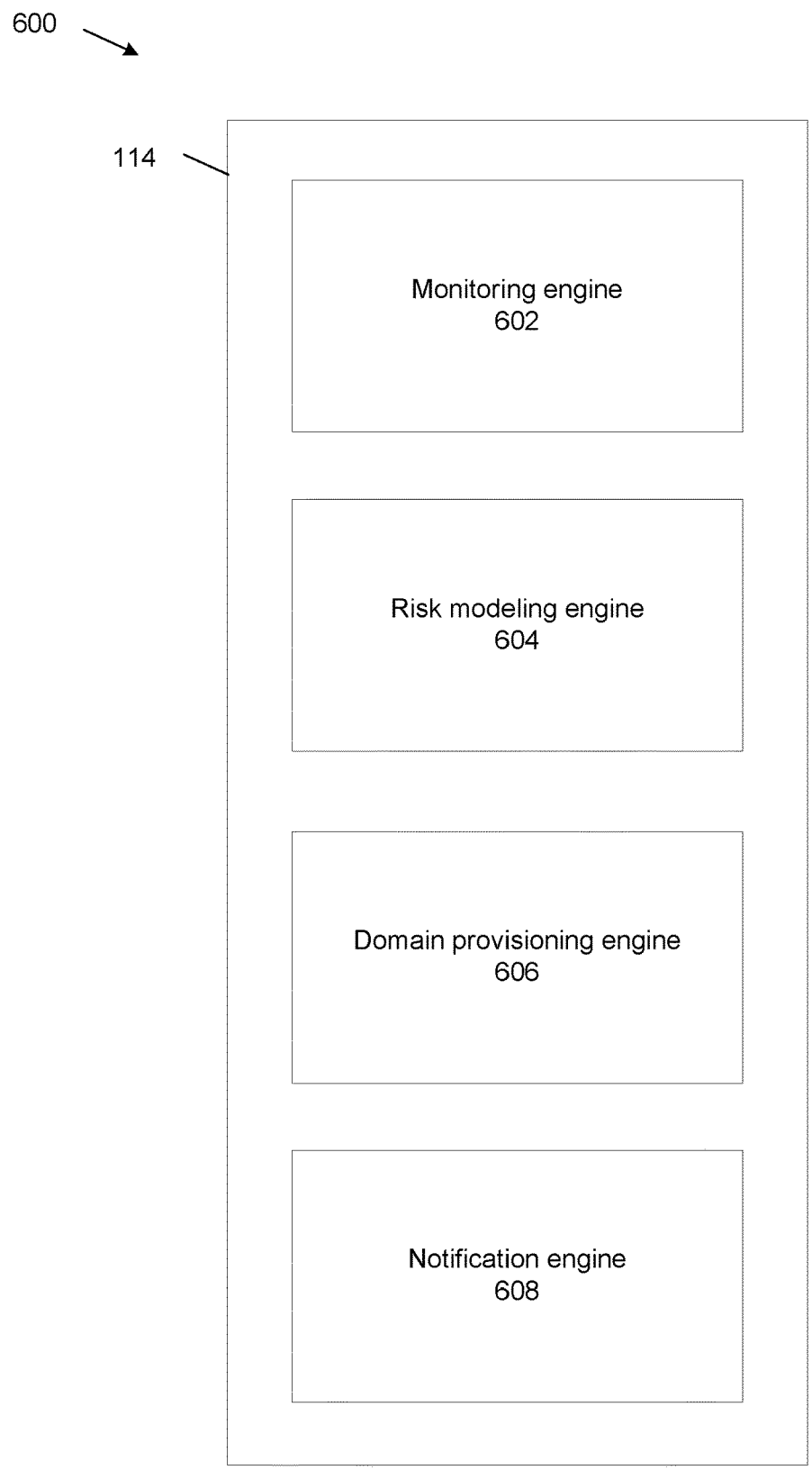
FIG. 6 shows example logical components of another communication system of the system of FIG. 1.

Referring now to FIG. 6, another embodiment of an example temporary self-provisioning communication system 600 created by the server device 114 is provided. The temporary self-provisioning communication system 600 is configured in a manner similar to the communication systems 200 and 500 described above. However, in this instance, the server device 114 is also programmed to automatically change the addresses for the communication system 600 when certain criteria are met.

For instance, as noted previously, there can be a static Internet Protocol (IP) address that is provisioned for the server device 114. There can be various DNS addresses assigned (e.g., mail.domain.com, chat.domain.com, etc.) that point to the static IP, plus an MX record for the mail server to send and receive mail for the communication system 600.

It some instances, it can be desirable to have a mechanism to determine when the communication system 600 is compromised. For instance, there may become a point at which the IP/DNS addresses (e.g., chat.domain.com, mail.domain.com, etc.) have become stale and/or risk compromise by an adversary. This can become an issue when they may become attributable, such as if users are routinely logging into them via business devices or from IP addresses associated with the business or when consistent attacks on the communication system 600 are detected (e.g., hacked emails, phishing attacks, etc.).

A decision to change to a new address can be made under a predetermined set of criteria. Such criteria can include at a periodic timeframe (even if there are little or no adverse events), can be automated, and can ideally require minimal manual intervention by users. The existing data can be automatically ported between the old and new domains upon such a change (e.g., chat.domain1.com to chat.domain2.com, mail.domain1.com to mail.domain2.com, etc.).

In one example, the communication system 600 can combine various criteria (such as the length of time the system has been used, the number of people using it, from where it is being accessed, etc.) to produce a risk scoring model. When indicated by the model, the addresses for the communication system 600 can be changed.

The provisioning of the new addresses can be automated by shifting the domain over via creating a new domain on the fly, provisioning a new static IP, making a copy of all the data then changing any domain specific variables, then sending messages with the addressing to all users along with a requirement to change each password. These details are provided below. The previous domain can be rapidly deprovisioned with no loss in data for the communication system 600.

Specifically, the example server device 114 can include (in addition to the functionality described above for the server device 114 to instantiate the temporary self-provisioning communication system 200 and/or automatically provision the temporary self-provisioning communication system 500), a monitoring engine 602, a risk modeling engine 604, a domain provisioning engine 606, and a notification engine 608. These potential additional components of the server device 114 can be used to automatically change the addresses for the communication system 600.

In the example shown, the monitoring engine 602 is programmed to monitor various criteria associated with the communication system 600 that may be relevant to determining when to change the addresses for the communication system 600. For instance, monitoring engine 602 can be programmed to generally track such criteria as: (i) how long the communication system 600 has been active; (ii) how many users are accessing the communication system 600; and/or (iii) from where the communication system 600 is being accessed.

For instance, the monitoring engine 602 examines the type and length of the cybersecurity event. If the event is severe, the time between changing of the addresses may be decreased. Further, the longer the event takes, the greater the likelihood that the "cyber-hygiene" associated with the communication system 600 will breakdown, thereby prompting a change in the addresses.

Further, the number of users for the communication system 600 and the number of times the users access it can also increase the likelihood of detection of the communication system 600. Further, the location of the users as they access the communication system 600 can be important. For instance, if the users are accessing the communication system 600 from company devices with known addresses, the likelihood of detection of the communication system 600 increases. The monitoring engine 602 can be programmed to monitor other criteria as well.

The example risk modeling engine 604 is programmed to receive the various criteria from the monitoring engine 602 and make a determination as to when the addresses for the communication system 600 should be changed. In one example, the risk modeling engine 604 uses AI to analyze the criteria, such as Elasticsearch from Elasticsearch B.V.

In this example, the risk modeling engine 604 is tuned to weigh each of the criteria from the monitoring engine 602 to calculate a risk score. For instance, each access of the communication system 600 by a user can be given a point score ranging from low (e.g., 0.5 points) to high (e.g., 10 points) based upon who is accessing it and from where. The points function to weight each of the criteria based upon severity.

For instance, if a user accesses the communication system 600 from an anonymous device and limits communication, only 0.5 points may be assessed by the risk modeling engine 604. However, if the user accesses the communication system 600 from a known business location numerous times, the monitoring engine 602 can assess a higher points value of 2 points per access.

Further, the risk modeling engine 604 can assess a certain number of points (e.g., per hour, per day, per week, etc.) that are dependent upon how long the communication system 600 is up and accessible. For instance, for a less-severe event, the risk modeling engine 604 can assess 0.25 points for each hour the communication system 600 is up. Conversely, the risk modeling engine 604 can assess 1 point per hour for a higher-severity event. Further, the number of points can escalate depending on the length of time.

In addition, the risk modeling engine 604 can assess threats to the communication system 600 and assign points based upon the threats. For instance, attempts to access the communication system 600 from domains known to host bad actors (e.g., .ru or .cn domains) can result in great points being added to the model by the risk modeling engine 604. Many other schemes for assessing points can be used.

The risk modeling engine 604 can sum the points to calculate a risk score and use a graduated set of thresholds (see example table below) to provide a quantitative indication of the security posture of the communication system 600. This sum can, in turn, be used to assess when to change the addressing for the communication system 600.

| Point threshold | Threat level | Description |
| --- | --- | --- |
| 0 | Green | Low threat of detection of communication system. No action needed. |
| 50 | Yellow | Medium threat of detection. Consider possible action. |
| 100 | Red | High threat of detection. Changing of address of communication system is recommended. |

For instance, when the communication system 600 is created, the risk modeling engine 604 can indicate that the communication system 600 is at a first level (e.g., green). As the monitoring engine 602 provides criteria to the risk modeling engine 604 and the risk modeling engine 604 assesses points that increase the risk score, the point total can reach an intermediate threshold, whereupon the risk modeling engine 604 increases the threat monitoring level (e.g., to yellow). Further, as the points assessed by the risk modeling engine 604 increase past another threshold, the risk modeling engine 604 increases the threat monitoring level to red. Upon reaching the red level, the risk modeling engine 604 can cause the addressing for the communication system 600 to be changed, as described below.

The example domain provisioning engine 606 is programmed to change the addressing for the communication system 600 upon the risk modeling engine 604 indicating that such a change is necessary. This can be instituted, for example, when the points assigned by the risk modeling engine 604 reach a threshold level (e.g., red), as described above.

In one example, the domain provisioning engine 606 is generally programmed to (i) create a new address for the communication system 600 and (ii) reprovision the communication system 600 to work with the new address so that data already associated with the communication system 600 is maintained.

For instance, the domain provisioning engine 606 can provision a new IP address for the communication system 600 and create the appropriate DNS and MX entries. The IP address and DNS/MX entries can be assigned pseudo-randomly by the domain provisioning engine 606 so that tracking of the changes by bad actors is more difficult. For instance, the domain provisioning engine 606 can use a random number generator when requesting a new IP address to randomize the assignment of the new IP address. Many different configurations are possible.

In one example, the domain provisioning engine 606 can use scripting provided by Amazon Route 53 (AWS Route 53) to reassign the addressing for the various components of the communication system 600 For instance, the domain provisioning engine 606 can use scripts executed by Amazon Route 53 to create new DNS routing and load balancing for the communication system 600. This can result in a new static IP and DNS/MX entries being assigned for the communication system 600. Similar tools (e.g., Cloudflare) are provided by Google and Azure that offer this API-driven DNS functionality.

Finally, the example notification engine 608 is programmed to notify the users of the communication system 600 of the new addressing. For instance, as described further above, the domain provisioning engine 606 can send an out-of-band message (this prevents any unwanted interception of emails from man-in-the-middle attacks) to each of the users with the new addressing information for the communication system 600.

For instance, in one example, the notification engine 608 is programmed to send a text message to each user with addressing information, such as like the following.

The new address for the communication system has been moved to mail.newdomain.com. Please use a nonattributable device to access the communication system at this new address. You will need to create a new password.

Many other configurations are possible.

Figure 7:
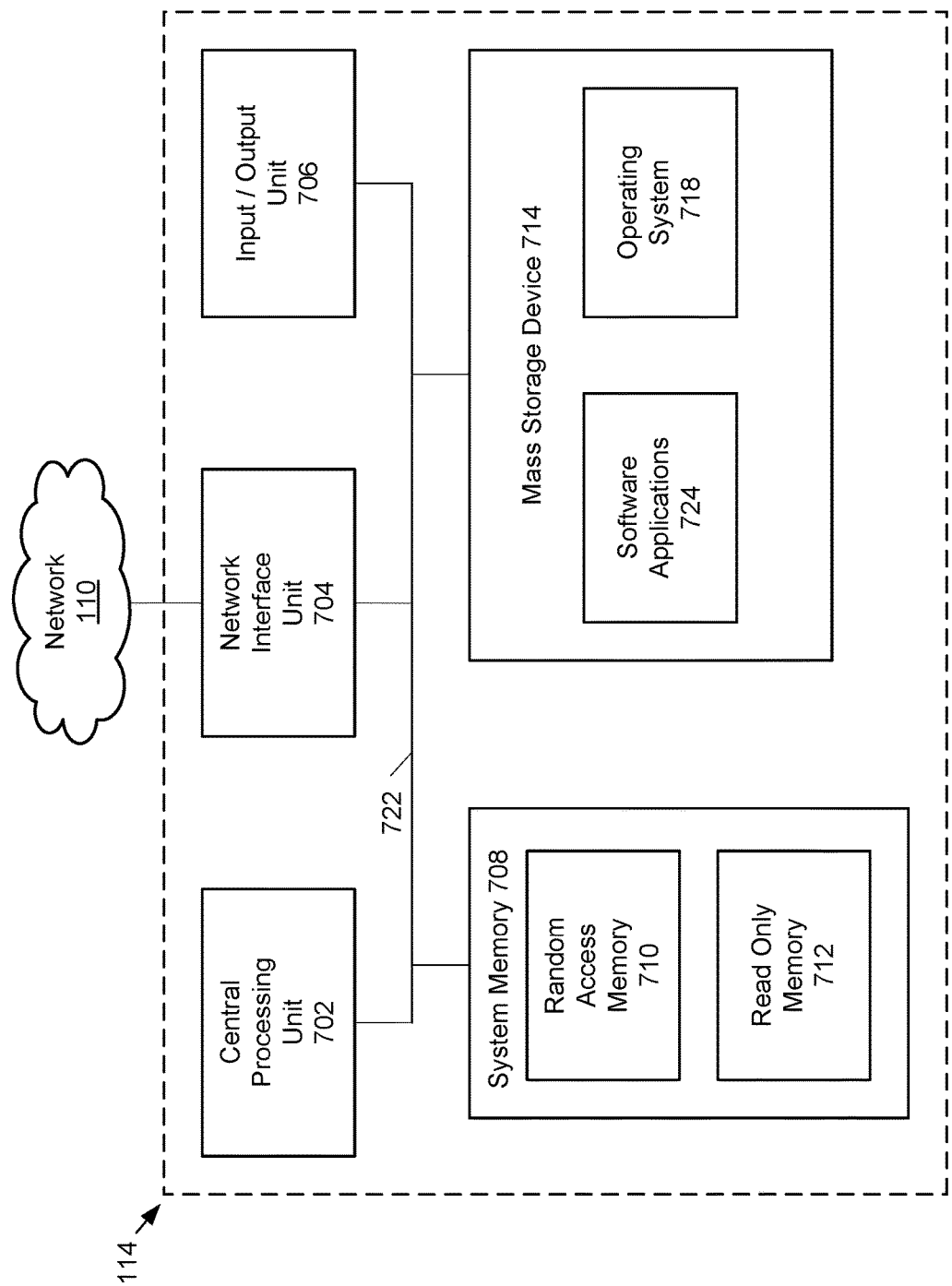
FIG. 7 shows example physical components of the communication system of FIG. 2.

As illustrated in the embodiment of FIG. 7, the example server device 114 which provides the communication services can include at least one central processing unit ("CPU") 702, a system memory 708, and a system bus 722 that couples the system memory 708 to the CPU 702. The system memory 708 includes a random access memory ("RAM") 710 and a read-only memory ("ROM") 712. A basic input/output system containing the basic routines that help transfer information between elements within the server device 114, such as during startup, is stored in the ROM 712. The server device 114 further includes a mass storage device 714. The mass storage device 714 can store software instructions and data. A central processing unit, system memory, and mass storage device similar to that depicted are also included in other computing devices disclosed herein (e.g., the devices 102, 104, 106, 112, 114).

The mass storage device 714 is connected to the CPU 702 through a mass storage controller (not shown) connected to the system bus 722. The mass storage device 714 and its associated computer-readable data storage media provide non-volatile, non-transitory storage for the server device 114. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 114.

According to various embodiments of the invention, the server device 114 may operate in a networked environment using logical connections to remote network devices through network 110, such as a wireless network, the Internet, or another type of network. The server device 114 may connect to network 110 through a network interface unit 704 connected to the system bus 722. It should be appreciated that the network interface unit 704 may also be utilized to connect to other types of networks and remote computing systems. The server device 114 also includes an input/output controller 706 for receiving and processing input from a number of other devices, including a touch user interface display screen or another type of input device. Similarly, the input/output controller 706 may provide output to a touch user interface display screen or other output devices.

As mentioned briefly above, the mass storage device 714 and the RAM 710 of the server device 114 can store software instructions and data. The software instructions include an operating system 718 suitable for controlling the operation of the server device 114. The mass storage device 714 and/or the RAM 710 also store software instructions and applications 724, that when executed by the CPU 702, cause the server device 114 to provide the functionality of the server device 114 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for providing a communication system, comprising:
   one or more processors; and
   non-transitory computer-readable storage media encoding instructions which, when executed by the one or more processors, causes the computer system to:
      monitor criteria associated with the communication system, wherein the criteria relate to security characteristics associated with anonymity of the communication system, and wherein the communication system is a temporary self-provisioning system;
      assign a weight to the criteria to determine a risk score associated with the security characteristics of the communication system;
      automatically change an address of the communication system to a new address when the risk score exceeds a threshold; and
      move data associated with the communication system to the new address, including to:
         automatically port existing data between the address and the new address; and
         automatically change domain-specific variables to avoid loss in data for the communication system.

2. The computer system of claim 1, wherein the criteria are selected from one or more of: a length of time the communication system has been active; a number of users accessing the communication system; and from where is the communication system is accessed.

3. The computer system of claim 1, wherein the weight is graduated based upon a type of the criteria.

4. The computer system of claim 1, comprising further instructions which, when executed by the one or more processors, causes the computer system to sum the weight for each of the criteria to calculate the risk score.

5. The computer system of claim 4, comprising further instructions which, when executed by the one or more processors, causes the computer system to compare the risk score to the threshold.

6. The computer system of claim 1, wherein a new static Internet Protocol address is generated for the communication system.

7. The computer system of claim 1, wherein a new domain name is generated for the communication system.

8. The computer system of claim 1, comprising further instructions which, when executed by the one or more processors, causes the computer system to:
   receive a command to create the communication system based upon an event;
   automatically install the communication system in a cloud computing environment.

9. The computer system of claim 8, comprising further instructions which, when executed by the one or more processors, causes the computer system to automatically provision the communication system in the cloud computing environment.

10. The computer system of claim 8, comprising further instructions which, when executed by the one or more processors, causes the computer system to:
    receive a single second command to remove the communication system; and
    automatically remove the communication system from the cloud computing environment.

11. A method for providing a communication system, comprising:
    monitoring criteria associated with the communication system, wherein the criteria relate to security characteristics associated with anonymity of the communication system, and wherein the communication system is a temporary self-provisioning system;
    assigning a weight to the criteria to determine a risk score associated with the security characteristics of the communication system;
    automatically changing an address of the communication system to a new address when the risk score exceeds a threshold; and
    moving data associated with the communication system to the new address, including:
       automatically porting existing data between the address and the new address; and
       automatically changing domain-specific variables to avoid loss in data for the communication system.

12. The method of claim 11, wherein the criteria are selected from one or more of: a length of time the communication system has been active; a number of users accessing the communication system; and from where is the communication system is accessed.

13. The method of claim 11, wherein the weight is graduated based upon a type of the criteria.

14. The method of claim 11, further comprising summing the weight for each of the criteria to calculate the risk score.

15. The method of claim 14, further comprising comparing the risk score to the threshold.

16. The method of claim 11, wherein a new static Internet Protocol address is generated for the communication system.

17. The method of claim 11, wherein a new domain name is generated for the communication system.

18. The method of claim 11, further comprising:
   receiving a command to create the communication system based upon an event;
   automatically installing the communication system in a cloud computing environment.

19. The method of claim 18, further comprising automatically provisioning the communication system in the cloud computing environment.

20. The method of claim 18, further comprising:
   receiving a single second command to remove the communication system; and
   automatically removing the communication system from the cloud computing environment.

* * * * *